(12) United States Patent
Weller

(10) Patent No.: US 8,987,351 B2
(45) Date of Patent: Mar. 24, 2015

(54) FILLER TREATMENTS UTILIZING LOW VOC SILANES

(75) Inventor: Keith Weller, North Greenbush, NY (US)

(73) Assignee: Momentive Performance Materials Inc., Waterford, NY (US)

(*) Notice: Subject to any disclaimer, the term of this patent is extended or adjusted under 35 U.S.C. 154(b) by 381 days.

(21) Appl. No.: 11/288,485

(22) Filed: Nov. 23, 2005

(65) Prior Publication Data

US 2006/0178451 A1 Aug. 10, 2006

Related U.S. Application Data

(60) Provisional application No. 60/650,907, filed on Feb. 8, 2005.

(51) Int. Cl.
| | | |
|---|---|---|
| *C08K 9/06* | (2006.01) | |
| *C08L 83/00* | (2006.01) | |
| *C08G 77/00* | (2006.01) | |
| *B60C 1/00* | (2006.01) | |
| *C08K 5/5415* | (2006.01) | |

(52) U.S. Cl.
CPC ............ *C08K 9/06* (2013.01); *C08K 5/5415* (2013.01); *Y10S 524/904* (2013.01)
USPC ........... 523/212; 428/405; 523/213; 524/188; 524/431; 524/904; 556/413; 556/418

(58) Field of Classification Search
CPC ................................ C08K 5/5415; C08K 9/06
USPC ........................................................ 423/335
See application file for complete search history.

(56) References Cited

U.S. PATENT DOCUMENTS

| | | | |
|---|---|---|---|
| 4,151,154 A | 4/1979 | Berger | |
| 5,008,305 A * | 4/1991 | Kennan et al. | 523/212 |
| 5,112,919 A | 5/1992 | Furrer et al. | |
| 5,116,886 A * | 5/1992 | Wolff et al. | 523/209 |
| 5,501,732 A | 3/1996 | Niedenzu et al. | |
| 5,607,994 A | 3/1997 | Tooley et al. | |
| 5,631,310 A | 5/1997 | Tooley et al. | |
| 6,133,466 A | 10/2000 | Edelmann et al. | |
| 6,395,856 B1 | 5/2002 | Petty et al. | |
| 6,534,568 B1 | 3/2003 | Katz et al. | |
| 7,625,975 B2 | 12/2009 | Barfurth et al. | |
| 2003/0027897 A1 | 2/2003 | Mei et al. | |
| 2003/0199619 A1 * | 10/2003 | Cruse | 524/261 |
| 2005/0245753 A1 * | 11/2005 | Cruse et al. | 556/413 |
| 2006/0036034 A1 * | 2/2006 | Chaves et al. | 525/100 |

FOREIGN PATENT DOCUMENTS

| | | |
|---|---|---|
| FR | 2 382 456 A | 9/1978 |
| JP | S47-033127 | 11/1972 |

OTHER PUBLICATIONS

English-language translation of Japanese Notice of Reasons for Rejection Transmittal on Mar. 6, 2012 in corresponding Japanese Patent Application No. 2007-554324 citing Japanese Unexamined Patent Application Publication No. S-47-033127.

* cited by examiner

*Primary Examiner* — Yun Qian

(74) *Attorney, Agent, or Firm* — Dominick G. Vacari

(57) ABSTRACT

A method for treating filler material includes contacting the filler material with a silane which, upon hydrolysis, produces substantially no significant amount of volatile organic compound and/or the hydrolyzate of the silane to provide a treated filler which can then be incorporated into a matrix to provide a composite body.

20 Claims, No Drawings

FILLER TREATMENTS UTILIZING LOW VOC SILANES

CROSS REFERENCE TO RELATED APPLICATIONS

The present application claims priority to U.S. provisional application Ser. No. 60/650,907 filed Feb. 8, 2005, which is herein incorporated by reference.

BACKGROUND OF THE INVENTION

Particulate filler material is typically incorporated into a matrix to enhance certain properties of the composite such as strength, color, bulk, etc. The matrix is typically a thermoplastic or thermoset polymeric resin. The particulate filler is usually treated with a silane to modify the surface properties of the filler and/or couple the filler to the matrix material. The silane treatment can lead to improvements in filler dispersion, chemical resistance, abrasion resistance, high temperature deformation, wet and dry electrical properties, scratch resistance, tensile strength, flexural strength, and other mechanical properties.

Silanes are commonly employed as treatments for a variety of inorganic particulate fillers, such as silicas, talcs, clays, and aluminas. Typical fillers include wollastonite, alumina tri-hydrate (ATH), magnesium hydroxide, kaolin, bentonite, precipitated or fumed silica, titanium dioxide, glass beads, and basalt. Silanes are also used to a lesser degree with fillers such as calcium sulfate, calcium carbonate, barium sulfate, graphite, and carbon black. Natural fibrous fillers, such as hemp, flax, or kenaf, may also be used with silanes.

Some of the more commonly used silanes for filler treatment include aminopropyltriethoxysilane (Silquest® A-1100), glycidoxypropyltrimethoxysilane (Silquest® A-187), ureidopropyltrimethoxysilane (Silquest® A-1524), beta-(3,4-epoxycyclohexyl)ethyltrimethoxysilane (Silquest® A-186), methacryloxypropyltrimethoxysilane (Silquest® A-174), vinyl-tris-(2-methoxyethoxy)silane (Silquest® A-172) and vinyltriethoxysilane (Silquest® A-151), available from General Electric Company.

The use of alkoxy-functional silanes for the treatment of inorganic fillers results in the release of alcohol upon the hydrolysis of the silane, or reaction of the silane with the filler. This alcohol is typically methanol or ethanol, and can pose environmental, health, and safety concerns. As the emission of volatile organic compounds becomes more tightly regulated, filler treaters and compounders are many times forced to reduce production, install recovery or remediation equipment, or use special engineering controls to meet new, stricter emission limits as well as mitigate explosion or flammability hazards.

In some instances, conventional alkoxy-functional silanes can be prepared as stable, alcohol-free aqueous solutions, and these silane solutions can sometimes be utilized as filler treatments to reduce volatile emissions. An example would be the aqueous solution of aminopropyltrisilanol (Silquest® A-1106). However, in general, there are only a few examples where silanes can be prepared as stable, alcohol-free aqueous solutions. In addition, aqueous solutions of silanes typically result in increased costs to the end-user due to the extra processing steps required in their production, and the increased costs of shipment of the associated water.

Alternatively, silane oligomers may be used in some instances to reduce emissions of volatile organic compounds (VOCs) during the treatment of fillers. Again, only limited types of silanes are available as oligomers, and they do not always offer the same level of performance as conventional silanes.

Filler treaters and compounders need a more cost-effective way to reduce the emission of VOCs from their processes that employ conventional silanes.

BRIEF DESCRIPTION OF THE INVENTION

A method for treating particulate filler material is provided herein which comprises contacting the filler with a composition containing silane which upon hydrolysis, produces substantially no significant amount of volatile organic compound (VOC) and/or the silicon-containing hydrolyzate of the silane.

The method advantageously offers reduced emissions of VOCs when compared with the use of compositions containing conventional alkoxy-functional silanes.

DETAILED DESCRIPTION OF THE INVENTION

A composition for treating particulate filler materials includes low VOC silane and/or the silicon-containing hydrolyzate of the silane as treatment agent to modify the surface properties of the filler particles and/or couple the filler particles to the matrix into which they are incorporated.

The low VOC silane can be used neat or with a liquid carrier. The liquid-carrier can be water, in which case the low VOC silane will hydrolyze to a silicon-containing hydrolyzate without producing any significant amount of volatile organic compound by-product. In another embodiment, the liquid carrier can be an organic compound, the silane being applied to the filler in an initially non-hydrolyzed or partially hydrolyzed condition. Organic compounds suitable for use as liquid carriers in the filler treatment composition of the invention include linear and branched aliphatic and aromatic hydrocarbons, alcohols, ethers, and aprotic solvents such as dimethylformamide or 1-methyl-2-pyrrolidinone.

The silane, or silicon-containing hydrolyzate bonds with functionalities on the surfaces of the filler material. Such functionalities include, but are not limited to, silanols, carboxylic acids and carbinols. These functional groups are capable of reacting with the hydrolyzable groups of the silane, or with the silane hydrolyzates, to form covalent bonds between the silane and the surface of the filler. One such example of a covalent bond would be the siloxane linkage (Si—O—Si) formed by the reaction of a silane with a silanol present on the surface of a siliceous filler.

The low VOC silane, upon hydrolysis, produces no significant amount of VOCs. The expression "volatile organic compound" (VOC) as used herein shall be understood to apply to organic compounds which, when substantially pure, possess a boiling point up to about 185° C. at atmospheric pressure. Specific examples of such VOCs include, but are not limited to, methanol, ethanol, propanol, isopropanol, butanol, and 2-methoxyethanol. Typical filler particles suitable for treatment with the low VOC silanes include, but are not limited to, wollastonite, alumina tri-hydrate (ATH), magnesium hydroxide, kaolin, bentonite, precipitated or fumed silica, titanium dioxide, glass beads, basalt, calcium sulfate, calcium carbonate, barium sulfate, graphite, and carbon black. Natural fillers, such as hemp, flax, or kenaf, may also be used with silanes.

In one embodiment of the invention, the low VOC silanes (inclusive of the partially or fully hydrolyzed silicon-containing products thereof) include cyclic diol-substituted silanes which upon hydrolysis provide by-product diols of very low volatility. These silanes hydrolyze in a similar fashion to conventional, alkoxy-substituted silanes. Upon hydrolysis of the cyclic diol-substituted silane, the diol or diols is released, and a silane similar in composition to that produced upon the hydrolysis of conventional alkoxy-substituted silane is formed. The commonly accepted product of hydrolysis of conventional silanes is a silanol-containing species, which may then react further, either with itself or with other species. The diol by-product resulting from the hydrolysis of cyclic diol-substituted silanes is not released in significant quantities into the environment due to its low vapor pressure. Therefore, since cyclic diol-substituted silanes hydrolyze to produce silanol-containing species, they react in a similar fashion as conventional silanes, but do not release volatile organic compounds, such as alcohols.

In accordance with another embodiment of the invention, silane useful in the treatment method and composition of the present invention is represented by the general formula:

$$[Y[-G(-SiX_u Z^b_v Z^c_w)_s]_r]_n \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms; each occurrence of X is independently selected from the group consisting of —Cl, —Br, $R^1O$—, $R^1C(=O)O$—, $R^1R^2C=NO$—, $R^1R^2NO$— or $R^1R^2N$—, —$R^1$, —$(OSi\ R^1R^2)_t(OSi\ R^1R^2R^3)$, and —$O(R^{10}CR^{11})_tOH$, wherein each occurrence of $R^1$, $R^2$, $R^3$, $R^{10}$, and $R^{11}$ is independently R; each occurrence of $Z^b$ is independently $(-O-)_{0.5}$, and $[-O(R^{10}CR^{11})_tO-]_{0.5}$, wherein each occurrence of $R^{10}$ and $R^{11}$ is independently R; each occurrence of $Z^c$ is independently given by —$O(R^{10}CR^{11})_tO$— wherein each occurrence of R and $R^{10}$ and $R^{11}$ is independently R; each occurrence of R is chosen independently from the set of groups comprising hydrogen; straight, cyclic or branched alkyl groups and may contain unsaturated, alkenyl groups, aryl groups, and aralkyl groups; or molecular components obtained by removal of one or more hydrogen atoms of a heterocarbon; each occurrence of R containing 1 to about 20 carbon atoms; each occurrence of the subscript f is an integer from 1 to about 15, each occurrence of n is an integer from 1 to about 100, with the proviso that when n is greater than 1, v is a greater than 0 and all the valences for $Z^b$ have a silicon atom bonded to them, each occurrence of the subscript u is an integer from 0 to about 3, each occurrence of the subscript v is an integer from 0 to about 3, each occurrence of the subscript w is an integer from 0 to about 1, with the proviso that u+v+2w=3, each occurrence of the subscript r is an integer from 1 to about 6, each occurrence of the subscript t is an integer from 0 to about 50, and each occurrence of the subscript s is an integer from 1 to about 6; and each occurrence of Y is an organofunctional group of valence r; and at least one cyclic and bridging dialkoxy organofunctional silane comprising the cyclic and bridging dialkoxy organofunctional silane composition containing at least one occurrence of $Z^b$ or $Z^c$.

More particularly, Group Y herein includes univalent organofunctional groups (r=1), divalent organofunctional groups (r=2), trivalent organofunctional groups (r=3), tetravalent organofunctional groups (r=4), as well as organofunctional groups of higher valency, herein referred to as polyvalent organofunctional groups. The term polyvalent organofunctional group herein shall be understood to include univalent, divalent, trivalent, and tetravalent organofunctional groups.

Y can be a univalent group such as vinyl groups $CH_2=CH$—, $CHR=CH$—, or $CR_2=CH$—, wherein R is as set forth above. Moreover, in another embodiment, the silane can include univalent organofunctional groups such as mercapto and acyloxy groups such as acryloxy, methacryloxy and acetoxy, univalent epoxys such as glycidoxy, —O—$CH_2$—$C_2H_3O$; epoxycyclohexylethyl, —$CH_2$—$CH_2$—$C_6H_9O$; epoxycyclohexyl, —$C_6H_9O$; epoxy, —$CR^6(-O-)CR^4R^5$, univalent organofunctional groups such as hydroxy, carbamate, —$NR^4C(=O)OR^5$; urethane, —$OC(=O)NR^4R^5$; thiocarbamate, —$NR^4C(=O)SR^5$; thiourethane, —$SC(=O)NR^4R^5$; thionocarbamate, —$NR^4C(=S)OR^5$; thionourethane, —$OC(=S)NR^4R^5$; dithiocarbamate, —$NR^4C(=S)SR^5$; and dithiourethane, —$SC(=S)NR^4R^5$, univalent organofunctional groups such as maleimide; maleate and substituted maleate; fumarate and substituted fumarate; nitrile, CN; citraconimide, univalent organofunctional groups such as cyanate, —OCN; isocyanate, —N=C=O; thiocyanate, —SCN; isothiocyanate, —N=C=S; and ether, —$OR^4$, univalent organofunctional groups such as fluoro, —F; chloro, —Cl; bromo, —Br; iodo, —I; and thioether, —$SR^4$, univalent organofunctional groups such as disulfide, —S—$SR^4$; trisulfide, —S—S—$SR^4$; tetrasulfide, —S—S—S—$SR^4$; pentasulfide, —S—S—S—S—$SR^4$; hexasulfide, —S—S—S—S—S—$SR^4$; and polysulfide, —$S_xR^4$, univalent organofunctional groups such as xanthate, —$SC(=S)OR^4$; trithiocarbonate, —$SC(=S)SR^4$; dithiocarbonate, —$SC(=O)SR^4$; ureido, —$NR^4C(=O)NR^5R^6$; thionoureido (also better known as thioureido), —$NR^4C(=S)NR^5R^6$; amide, $R^4C(=O)NR^5$— and —$C(=O)NR^4R^5$—; thionoamide (also better known as thioamide), $R^4C(=S)NR^4$—; univalent melamino; and, univalent cyanurato, univalent organofunctional groups such as primary amino, —$NH_2$; secondary amino, —$NHR^4$; and tertiary amino, —$NR^4R^5$.univalent diamino, —$NR^4$-$L^1$-$NR^5R^6$; univalent triamino, —$NR^4$-$L^1(-NR^5R^6)_2$ and —$NR^4$-$L^1$-$NR^5$-$L^2$-$NR^6R^7$; and univalent tetraamino, —$NR^4$-$L^1(-NR^5R^6)_3$, —$NR^4$-$L$-$NR^5$-$L^2$-$NR^6$-$L^3$-$NR^7R^8$, and —$NR^4$-$L^1$-$N(-L^2NR^5R^6)_2$; wherein each occurrence of $L^1$, $L^2$, and $L^3$ is selected independently from the set of structures given above for G; each occurrence of $R^4$, $R^5$, $R^6$, $R^7$ and $R^8$ is independently given by one of the structures listed above for R; and each occurrence of the subscript, x, is independently given by x is 1 to 10.

In another embodiment, the silane can include divalent organofunctional groups such as epoxy, -(-)$C(-O-)CR^4R^5$ and —$CR^5(-O-)CR^4$—, divalent organofunctional groups such as carbamate, -(-)$NC(=O)OR^5$; urethane, —$OC(=O)NR^4$—; thiocarbamate, -(-) $NC(=O)SR^5$; thiourethane, —$SC(=O)NR^4$—; thionocarbamate, -(-)$NC(=S)OR^5$; thionourethane, —$OC(=S)NR^4$—; dithiocarbamate, -(-)$NC(=S)SR^5$; dithiourethane, —$SC(=S)NR^4$—; and ether, —O—, divalent organofunctional groups such as maleate and substituted maleate; fumarate and substituted fumarate, thioether, —S—; disulfide, —S—S—; trisulfide, —S—S—S—; tetrasulfide, —S—S—S—S—; pentasulfide, —S—S—S—S—S—; hexasulfide, —S—S—S—S—S—S—; and polysulfide, —$S_x$—, divalent organofunctional groups such as xanthate, —$SC(=S)O$—; trithiocarbonate, —$SC(=S)S$—; dithiocarbonate, —$SC(=O)S$—; ureido, -(-)$NC(=O)NR^4R^5$ and —$NR^4C(=O)NR^5$—; thionoureido, also better known as thioureido, -(-) $NC(=S)NR^4R^5$ and —$NR^4C(=S)NR^5$—; amide, $R^4C(=O)N(-)$- and —$C(=O)NR^4$—; thionoamide, also better known as thioamide, $R^4C(=S)N(-)$-; divalent melamino; divalent cyanurato, divalent organofunctional groups such as secondary amino, —NH—; tertiary amino, —$NR^4$—; divalent diamino, -(-)$N$-$L^1$-$NR^4R^5$ and —NR$^4$-L$^1$-NR$^5$—; divalent triamino, (–)NR$^4$)$_2$-L$^1$-NR$^5$R$^6$, -(–)N-L$^1$-NR$^5$-L$^2$-NR$^6$R$^7$, —NR$^4$-L$^1$-N(–)-L$^2$-NR$^5$R$^6$, and —NR$^4$-L$^1$-NR$^5$-L$^2$-NR$^6$—; and divalent tetraamino, -(–)N-L$^1$-(NR$^5$R$^6$)$_3$, (—NR$^4$)$_2$-L$^1$-(NR$^5$R$^6$)$_2$, -(–)N-L$^1$-NR$^4$-L$^2$-NR$^5$-L$^3$-NR$^6$R$^7$, —NR$^4$-L$^1$-N(–)-L$^2$-NR$^5$-L$^3$-NR$^6$R$^7$, —NR$^4$-L$^1$-NR$^5$-L$^2$-N(–)-L$^3$-NR$^6$R$^7$, —NR$^4$-L$^1$-NR$^5$-L$^2$-NR$^6$-L$^3$-NR$^7$—, -(–)N-L$^1$-N(-L$^2$NR$^5$R$^6$)$_2$, and (—NR$^4$L$^1$-)$_2$N-L$^2$NR$^5$R$^6$; wherein each occurrence of L$^1$, L$^2$, and L$^3$ is selected independently from the set of structures given above for G; each occurrence of R$^4$, R$^5$, R$^6$, and R$^7$ is independently given by one of the structures listed above for R; and each occurrence of the subscript, x, is independently given by x is 1 to 10.

In another embodiment, the silane can include trivalent organofunctional groups such as epoxy, -(–)C(—O—)CR$^4$—, trivalent organofunctional groups such as carbamate, -(–)NC(=O)O—; thiocarbamate, -(–)NC(=O)S—; thionocarbamate, -(–)NC(=S)O—; and dithiocarbamate, -(–)NC(=S)S—, ureido, -(–)NC(=O)NR$^4$—; thionoureido, also better known as thioureido, -(–)NC(=S)NR$^4$—; amide, —C(=O)N(-)-; thionoamide, also better known as thioamide, —C(=S)N(-)-; trivalent melamino; and trivalent cyanurato, trivalent organofunctional groups such as tertiary amino, —N(-)-; trivalent diamino, -(–)N-L$^1$-NR$^4$—; trivalent triamino, (—NR$^4$)$_3$-L$^1$, (—NR$^4$)$_2$-L$^1$-NR$^5$—, -(–)N-L$^1$-N(–)-L$^2$-NR$^3$R$^4$, —NR$^4$-L$^1$-N(–)-L$^2$-NR$^5$—, and -(–)N-L$^1$-NR$^4$-L$^2$-NR$^5$—; and trivalent tetraamino, -(–)N-L$^1$-N(–)-L$^2$-NR$^5$-L$^3$-NR$^3$R$^4$, —NR$^4$-L$^1$-N(–)-L$^2$-N(–)-L$^3$-NR$^3$R$^4$, -(–)N-L$^1$-NR$^5$-L$^2$-N(–)-L-NR$^3$R$^4$, —NR$^4$-L$^1$-N(–)-L$^2$-NR$^3$-L$^3$-NR$^4$—, -(–)N-L$^1$-N(-L$^2$NR$^3$R$^4$)(-L$^2$NR$^5$—), and (—NR$^4$L$^1$-)$_3$N; wherein each occurrence of L$^1$, L$^2$, and L$^3$ is selected independently from the set of structures given above for G; and each occurrence of R$^4$, R$^5$, and R$^6$ is independently given by one of the structures listed above for R.

In another embodiment, the silane can include tetravalent organofunctional group such as epoxy, -(–)C(—O—)C(-)-; tetravalent organofunctional groups such as ureido, -(–)NC(=O)N(-)-; thionoureido (also better known as thioureido), -(–)NC(=S)N(-)-; and tetravalent melamine, tetravalent organofunctional groups tetravalent diamino, -(–)N-L$^1$-N(-)-; tetravalent triamino, (—NR$^4$)$_4$-L$^1$, (—NR$^4$)$_2$-L$^1$-N(-)-,-(–)N-L$^1$-N(–)-L$^2$-NR$^3$—, and -(–)N-L$^1$-NR$^4$-L$^2$(–)-; and tetravalent tetraamino, -(–)N-L$^1$-N(–)-L$^2$-N(–)-L$^3$-NR$^4$R$^3$, —NR$^4$-L$^1$-N(–)-L$^2$-N(–)-L$^3$-NR$^3$—, -(–)N-L$^1$-NR$^4$-L$^2$-NR$^3$-L$^3$-N(–)-, and -(–)N-L$^1$-N(-L$^2$NR$^3$—)$_2$; wherein each occurrence of L$^1$, L$^2$, and L$^3$ is selected independently from the set of structures given above for G; and each occurrence of R$^4$ and R$^5$ is independently given by one of the structures listed above for R.

In another embodiment, the silane can include polyvalent organofunctional groups such as, but is not limited to, polyvalent hydrocarbon groups; pentavalent melamino, (—NR$^3$)(—N—)$_2$C$_3$N$_3$; hexavalent melamino, (—N—)$_3$C$_3$N$_3$; pentavalent triamino, -(–)N-L$^1$-N(–)-L$^2$-N(-)-; pentavalent tetraamino, -(–)N-L$^1$-N(–)-L$^2$-N(–)-L$^3$-NR$^3$—, -(–)N-L$^1$-NR$^3$-L$^2$-N(–)-L$^3$-N(-)-, and [-(–)N-L$^1$-]$_2$N-L$^2$NR$^3$—; and hexavalent tetraamino, -(–)N-L$^1$-N(–)-L$^2$-N(–)-L$^3$-N(-)- and [-(–)N-L$^1$-]$_3$N; wherein each occurrence of L$^1$, L$^2$, and L$^3$ is selected independently from the set of structures given above for G; and each occurrence of R$^4$ is independently given by one of the structures listed above for R.

As used herein, diol, hydrocarbon diol, and difunctional alcohol refer to any structure given by Formula 2:

 (Formula 2)

wherein f, R$^{10}$, and R$^{11}$ are as defined above. These structures represent hydrocarbons or heterocarbons in which two hydrogen atoms are replaced with OH in accordance with the structures drawn in Formula 2. As used herein, dialkoxy and difunctional alkoxy refer to any hydrocarbon diol, as defined herein, in which the hydrogen atoms of the two OH groups have been removed to a give divalent radical, and whose structure is given by Formula 3:

 (Formula 3)

wherein f R$^{10}$, and R$^{11}$ are as defined above. As used herein, cyclic dialkoxy refers to a silane or group in which cyclization is about silicon, by two oxygen atoms each attached to a common divalent hydrocarbon or heterocarbon group, such as is commonly found in diols. Cyclic dialkoxy groups herein are represented by Z$^c$. As used herein, bridging dialkoxy refers to a silane or group in which two different silicon atoms are each bound to one oxygen atom, which is in turn bound to a common divalent hydrocarbon or heterocarbon group as defined herein, such as is commonly found in diols. Bridging dialkoxy groups herein are represented by Z$^b$. As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic dialkoxy group, a silane with a silicon atom not bound to a cyclic dialkoxy group and bound to bridging dialkoxy group(s) only, a silane with silicon bound to both one end of a bridging dialkoxy group and both ends of a cyclic dialkoxy group, a silane with a silicon atom not bound at all to a dialkoxy group (as long as at least one other silicon atom in the same molecule is bound to at least one cyclic or bridging dialkoxy group), etc. As used herein, hydrocarbon based diols refer to diols which contain two OH groups on a hydrocarbon or heterocarbon structure. The term, "hydrocarbon based diol", refers to the fact that the backbone between the two oxygen atoms consists entirely of carbon atoms, carbon-carbon bonds between the carbon atoms, and two carbon-oxygen bonds encompassing the alkoxy ends. The heterocarbons in the structure occur pendent to the carbon backbone.

The structures given by Formula 2 will herein be referred to as the appropriate diol, in a few specific cases, glycol is the more commonly used term, prefixed by the particular hydrocarbon or heterocarbon group associated with the two OH groups. Examples include neopentylglycol, 1,3-butanediol, and 2-methyl-2,4-pentanediol. The groups whose structures are given by Formula 3 will herein be referred to as the appropriate dialkoxy, prefixed by the particular hydrocarbon or heterocarbon group associated with the two OH groups. Thus, for example, the diols, neopentylglycol, 1,3-butanediol, and 2-methyl-2,4-pentanediol correspond herein to the dialkoxy groups, neopentylglycoxy, 1,3-butanedialkoxy, and 2-methyl-2,4-pentanedialkoxy, respectively.

The cyclic and bridging dialkoxy organofunctional silanes used herein, in which the silane is derived from a diol, commonly referred to as a glycol, are correspondingly glycoxysilane. Also, the cyclic and bridging organofunctional dialkoxy silanes used herein, in which the silane is derived from a diol, commonly referred to as a diol, are correspondingly named dialkoxysilane.

As used herein, the notations, (—O—)$_{0.5}$ and [—O(R$^{10}$CR$^{11}$)$_f$O—]$_{0.5}$, refer to one half of a siloxane group, Si—O—Si, and one half of a bridging dialkoxy group, respectively. These notations are used in conjunction with a silicon atom and they are taken herein to mean one half of an oxygen atom, namely, the half bound to the particular silicon atom, or to one half of a dialkoxy group, namely, the half bound to the particular silicon atom, respectively. It is understood that the other half of the oxygen atom or dialkoxy group and its bond to silicon occurs somewhere else in the overall molecular structure being described. Thus, the $(-O-)_{0.5}$ siloxane groups and the $[-O(R^{10}CR^{11})_f-]_{0.5}$ dialkoxy groups mediate the chemical bonds that hold two separate silicon atoms together, whether these two silicon atoms occur intermolecularly or intramolecularly. In the case of $[-O(R^{10}CR^{11})_f O-]_{0.5}$, if the hydrocarbon group, $(R^{10}CR^{11})_f$ is unsymmetrical, either end of $[-O(R^{10}CR^{11})_f O-]_{0.5}$ may be bound to either of the two silicon atoms required to complete the structures given in Formula 1.

As used herein, alkyl includes straight, branched and cyclic alkyl groups; alkenyl includes any straight, branched, or cyclic alkenyl group containing one or more carbon-carbon double bonds, where the point of substitution can be either at a carbon-carbon double bond or elsewhere in the group. Also, alkynyl includes any straight, branched, or cyclic alkynyl group containing one or more carbon-carbon triple bonds and optionally also one or more carbon-carbon double bonds as well, where the point of substitution can be either at a carbon-carbon triple bond, a carbon-carbon double bond, or elsewhere in the group. Specific examples of alkyls include methyl, ethyl, propyl, isobutyl. Specific examples of alkenyls include vinyl, propenyl, allyl, methallyl, ethylidenyl norbornane, ethylidene norbornyl, ethylidenyl norbornene and ethylidene norbornenyl. Specific examples of alkynyls include acetylenyl, propargyl and methylacetylenyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cyclic alkyl, cyclic alkenyl and cyclic alkynyl also include bicyclic, tricyclic, and higher cyclic structures, as well as the aforementioned cyclic structures further substituted with alkyl, alkenyl and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

As used herein, the term, heterocarbon, refers to any hydrocarbon structure in which the carbon-carbon bonding backbone is interrupted by bonding to atoms of nitrogen and/or oxygen; or in which the carbon-carbon bonding backbone is interrupted by bonding to groups of atoms containing nitrogen and/or oxygen, such as cyanurate ($C_3N_3O_3$). Thus, heterocarbons include, but are not limited to branched, straight-chain, cyclic and/or polycyclic aliphatic hydrocarbons, optionally containing ether functionality via oxygen atoms each of which is bound to two separate carbon atoms, tertiary amine functionality via nitrogen atoms each of which is bound to three separate carbon atoms, melamino groups and/or cyanurate groups; aromatic hydrocarbons; and arenes derived by substitution of the aforementioned aromatics with branched or straight chain alkyl, alkenyl, alkynyl, aryl and/or aralkyl groups.

Representative examples of G include $-(CH_2)_m-$ wherein m is 1 to 12; diethylene cyclohexane; 1,2,4-triethylene cyclohexane; diethylene benzene; phenylene; $-(CH_2)_p-$ wherein p is 1 to 20, which represent the terminal straight-chain alkyls further substituted terminally at the other end, such as $-CH_2-$, $-CH_2CH_2-$, $-CH_2CH_2CH_2-$, and $-CH_2CH_2CH_2CH_2CH_2CH_2CH_2-$, and their beta-substituted analogs, such as $-CH_2(CH_2)_qCH(CH_3)-$, where q is zero to 17; $-CH_2CH_2C(CH_3)_2CH_2-$; the structure derivable from methallyl chloride, $-CH_2CH(CH_3)CH_2-$; any of the structures derivable from divinylbenzene, such as $-CH_2CH_2(C_6H_4)CH_2CH_2-$ and $-CH_2CH_2(C_6H_4)CH(CH_3)-$, where the notation $C_6H_4$ denotes a disubstituted benzene ring; any of the structures derivable from dipropenylbenzene, such as $-CH_2CH(CH_3)(C_6H_4)CH(CH_3)CH_2-$, where the notation $C_6H_4$ denotes a disubstituted benzene ring; any of the structures derivable from butadiene, such as $-CH_2CH_2CH_2CH_2-$, $-CH_2CH_2CH(CH_3)-$, and $-CH_2CH(CH_2CH_3)-$; any of the structures derivable from piperylene, such as $-CH_2CH_2CH_2CH(CH_3)-$, $-CH_2CH_2CH(CH_2CH_3)-$, and $-CH_2CH(CH_2CH_2CH_3)-$; any of the structures derivable from isoprene, such as $-CH_2CH(CH_3)CH_2CH_2-$, $-CH_2CH(CH_3)CH(CH_3)-$, $-CH_2C(CH_3)(CH_2CH_3)-$, $-CH_2CH_2CH(CH_3)CH_2-$, $-CH_2CH_2C(CH_3)_2-$ and $-CH_2CH[CH(CH_3)_2]-$; any of the isomers of $-CH_2CH_2$-norbornyl-, $-CH_2CH_2$-cyclohexyl-; any of the diradicals obtainable from norbornane, cyclohexane, cyclopentane, tetrahydrodicyclopentadiene, or cyclododecene by loss of two hydrogen atoms; the structures derivable from limonene, $-CH_2CH(4$-methyl-1-$C_6H_9-)CH_3$, where the notation $C_6H_9$ denotes isomers of the trisubstituted cyclohexane ring lacking substitution in the 2 position; any of the monovinyl-containing structures derivable from trivinylcyclohexane, such as $-CH_2CH_2(vinylC_6H_9)CH_2CH_2-$ and $-CH_2CH_2(vinylC_6H_9)CH(CH_3)-$, where the notation $C_6H_9$ denotes any isomer of the trisubstituted cyclohexane ring; any of the monounsaturated structures derivable from myrcene containing a trisubstituted C=C, such as $-CH_2CH[CH_2CH_2CH=C(CH_3)_2]CH_2CH_2-$, $-CH_2CH[CH_2CH_2CH=C(CH_3)_2]CH(CH_3)-$, $-CH_2C[CH_2CH_2CH=C(CH_3)_2](CH_2CH_3)-$, $-CH_2CH_2CH[CH_2CH_2CH=C(CH_3)_2]CH_2-$, $-CH_2CH_2(C-)(CH_3)[CH_2CH_2CH=C(CH_3)_2]$, and $-CH_2CH[CH(CH_3)[CH_2CH_2CH=C(CH_3)_2]]-$; and any of the monounsaturated structures derivable from myrcene lacking a trisubstituted C=C, such as $-CH_2CH(CH=CH_2)CH_2CH_2CH_2C(CH_3)_2-$, $-CH_2CH(CH=CH_2)CH_2CH_2CH[CH(CH_3)_2]-$, $-CH_2C(=CH-CH_3)CH_2CH_2CH_2C(CH_3)_2-$, $-CH_2C(=CH-CH_3)CH_2CH_2CH[CH(CH_3)_2]-$, $-CH_2C(=CH_2)CH_2CH_2CH_2C(CH_3)_2-$, $-CH_2C(=CH_2)CH_2CH_2CH[CH(CH_3)_2]-$, $-CH_2CH=C(CH_3)_2CH_2CH_2C(CH_3)_2-$, and $-CH_2CH=C(CH_3)_2CH_2CH_2CH[CH(CH_3)_2]$.

Representative examples of R groups are H, branched and straight-chain alkyls of 1 to 20 carbon atoms such as methyl, ethyl, propyl, isopropyl, butyl, octenyl, cyclohexyl, phenyl, benzyl, tolyl, allyl, methoxyethyl, ethoxyethyl dimethylaminoethyl, cyanoethyl, and the like. In another embodiment, representative $R^{10}$ and $R^{11}$ groups are hydrogen, methyl, and ethyl, of which hydrogen and methyl are most preferred. In yet another embodiment, representative $R^1$ and $R^2$ groups can be hydrogen, methyl, ethyl, propyl. In still another embodiment, representative examples of $R^3$, $R^4$, $R^5$, $R^6$, $R^7$, and $R^8$ groups can be $H_2$, $C_1$ to $C_4$ straight chain or branched alkyls such as methyl, ethyl, propyl, isopropyl, butyl, isobutyl, pentyl, hexyl, heptyl, octyl, and aryl such as phenyl, benzyl, etc.

Specific examples of X are methoxy, ethoxy, propoxy, isopropoxy, isobutoxy, acetoxy, methoxyethoxy, and oximato, as well as the monovalent alkoxy groups derived from diols, known as "dangling diols", specifically, groups containing an alcohol and an alkoxy, such as $-O-CH_2CH-$ OH), such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of X are methoxy, acetoxy and ethoxy, as well as the monovalent alkoxy groups derived from the diols, ethylene glycol, propylene glycol, neopentyl glycol, 1,3-propanediol, 2-methyl-1,3-propanediol, 1,3-butanediol, and 2-methyl-2,4-pentanediol.

Specific examples of $Z^b$ and $Z^c$ can be the divalent alkoxy groups derived from diols, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of $Z^b$ and $Z^c$ are the divalent alkoxy groups derived from the diols such as ethylene glycol, propylene glycol, neopentyl glycol, 1,3-propanediol, 2-methyl-1,3-propanediol, 1,3-butanediol, and 2-methyl-2,4-pentanediol are preferred. The divalent alkoxy groups derived from the diols, 1,3-propanediol, 2-methyl-1,3-propanediol, 1,3-butanediol, and 2-methyl-2,4-pentanediol. The bridging ($Z^b$) content of the cyclic and bridging organofunctional silane compositions herein must be kept sufficiently low to prevent excessive average molecular weights and crosslinking, which would lead to gelation.

Additional embodiments are wherein v and w in Formulas 1 can be such that the ratio of w/v is between 1 and 9; X is RO—, RC(=O)O—; $Z^b$ and $Z^c$ can be derived from the diols, 1,3-propanediol, 2-methyl-1,3-propanediol, 1,3-butanediol, 2-methyl-2,4-pentanediol; R is alkyls of $C_1$ to $C_4$ and H; and G is a divalent straight chain alkyl of 2 to 18 carbon atoms. Other embodiments include those wherein w/v is between 2 and 8; X is ethoxy or one or more of the dangling diols derived from the diols, 1,3-propanediol, 2-methyl-1,3-propanediol, 1,3-butanediol, and 2-methyl-2,4-pentanediol; and G is a $C_2$-$C_{12}$ straight-chain alkyl derivative. Another embodiment are wherein v in Formula 1 is 0; X is RO—, RC(=O)O—; R is alkyls of $C_1$ to $C_4$ and H; and G is a divalent straight chain alkyl of 2 to 18 carbon atoms.

Representative examples of the cyclic and bridging dialkoxy organofunctional silanes described in the present invention include 2-(2-methyl-2,4 pentanedialkoxyethoxysilyl)-1-propyl amine;
2-(2-methyl-2,4-pentanedialkoxyisopropoxysilyl)-1-propyl mercaptan;
2-(2-methyl-2,4-pentanedialkoxymethylsilyl)-1-propyl chloride;
2-(2-methyl-2,4-pentanedialkoxyphenylsilyl)-1-propyl bromide;
3-(1,3-butanedialkoxyethoxysilyl)-1-propyl iodide;
3-(1,3-butanedialkoxyisopropoxysilyl)-1-propyl chloride;
N-[3-(1,3-propanedialkoxyethoxysilyl)-1-propyl]phenylamine;
N-[3-(1,3-propanedialkoxyisopropoxysilyl)-1-propyl]methylamine;
3-(1,2-propanedialkoxyethoxysilyl)-1-propyl glycidyl ether and 3-(1,2-propanedialkoxyisopropoxysilyl)-1-propyl methacrylate, both derivable from propylene glycol; 3-(1,2-ethanedialkoxyethoxysilyl)-1-propyl acrylate and 3-(1,2-ethanedialkoxyisopropoxysilyl)-1-propyl acetate, both derivable from ethylene glycol; 3-(neopentyl glycoxyethoxysilyl)-1-propyl amine and 3-(neopentyl glycoxyisopropoxysilyl)-1-propyl glycidyl ether, both derivable from neopentyl glycol; 3-(2,3-dimethyl-2,3-butanedialkoxyethoxysilyl)-1-propyl acrylate and 3-(2,3-dimethyl-2,3-butanedialkoxyisopropoxysilyl)-1-propyl methacrylate, both derivable from pinacol; 3-(2,2-diethyl-1,3-propanedialkoxyethoxysilyl)-1-propyl mercaptan; S-[3-(2,2-diethyl-1, propanedialkoxyisopropoxysilyl)-1-propyl]ethylthioether;
bis[3-(2-methyl-1,3-propanedialkoxyethoxysilyl)-1-propyl] disulfide;
bis[3-(2-methyl-1,3-propanedialkoxyisopropoxysilyl)-1-propyl]trisulfide;
bis[3-(1,3-butanedialkoxymethylsilyl)-1-propyl]tetrasulfide;
bis[3-(1,3-propanedialkoxymethylsilyl)-1-propyl]thioether;
3-(1,3-propanedialkoxyphenylsilyl)-1-propyl glycidyl thioether;
tris-N,N',N"-[3-(1,2-propanedialkoxymethylsilyl)-1-propyl] melamine and tris-N,N',N"-[3-(1,2-propanedialkoxyphenylsilyl)-1-propyl]melamine, both derivable from propylene glycol; 3-(1,2-ethanedialkoxymethylsilyl)-1-propyl chloride and 3-(1,2-ethanedialkoxyphenylsilyl)-1-propyl bromide, both derivable from ethylene glycol; 3-(neopentyl glycoxymethylsilyl)-1-propyl acetate and 3-(neopentyl glycoxyphenylsilyl)-1-propyl octanoate, both derivable from neopentyl glycol;
3-(2,3-dimethyl-2,3-butanedialkoxymethylsilyl)-1-propyl amine and 3-(2,3-dimethyl-2,3-butanedialkoxyphenylsilyl)-1-propyl amine, both derivable from pinacol; 3-(2,2-diethyl-1,3-propanedialkoxymethylsilyl)-1-propyl acrylate;
3-(2,2-diethyl-1,3-propanedialkoxyphenylsilyl)-1-propyl methacrylate;
3-(2-methyl-1,3-propanedialkoxyethylsilyl)-1-propyl glycidyl ether;
3-(2-methyl-1,3-propanedialkoxyphenylsilyl)-1-propyl acetate;
2-(2-methyl-2,4-pentanedialkoxyethoxysilyl)-1-ethyl acrylate;
2-(2-methyl-2,4-pentanedialkoxymethoxysilyl)-1-ethyl bromide;
2-(2-methyl-2,4-pentanedialkoxy methylsilyl)-1-ethyl benzenesulfonate;
2-methyl-2,4-pentanedialkoxyethoxysilylmethyl methacrylate;
2-methyl-2,4-pentanedialkoxyisopropoxysilylmethyl bromide;
neopentylglycoxypropoxysilylmethyl amine; propyleneglycoxymethylsilylmethyl mercaptan; neopentylglycoxyethylsilylmethyl glycidyl ether;
2-(neopentylglycoxyisopropoxysilyl)-1-ethyl butyrate;
2-(neopentylglycoxy methylsilyl)-1-ethyl propionate;
2-(1,3-butanedialkoxymethylsilyl)-1-ethyl acrylate;
3-(1,3-butanedialkoxyisopropoxysilyl)-4-butyl methacrylate;
3-(1,3-butanedialkoxyethylsilyl)-1-propyl mercaptan;
3-(1,3-butanedialkoxymethylsilyl)-1-propyl methanesulfonate;
6-(2-methyl-2,4-pentanedialkoxyethoxysilyl)-1-hexyl amine;
1-(2-methyl-2,4-pentanedialkoxyethoxysilyl)-5-hexyl acrylate;
8-(2-methyl-2,4-pentanedialkoxyethoxysilyl)-1-octyl methacrylate;
10-(2-methyl-2,4-pentanedialkoxyethoxysilyl)-1-decyl glycidyl ether;
3-(2-methyl-2,4-pentanedialkoxyethoxysilyl)-1-propyl trifluoromethanesulfonate;
3-(2-methyl-2,4-pentanedialkoxypropoxysilyl)-1-propyl amine;
N-[3-(2-methyl-2,4-pentanedialkoxyisopropoxysilyl)-1-propyl]ethylene diamine;

tris-N,N',N"-[3-(2-methyl-2,4-pentanedialkoxybutoxysilyl)-1-propyl]diethylene triamine; tetrakis-N,N',N",N"'-[3-(2-methyl-2,4-pentanedialkoxyisopropoxysilyl)-1-propyl] triethylene tetramine; bis-(3-(2-methyl-2,4-pentanedialkoxyethoxysilyl)-1-propyl)sulfide; 6-(1,3-butanedialkoxyethoxysilyl)-1-hexyl amine; 1-(1,3-butanedialkoxyethoxysilyl)-5-hexyl glycidyl ether; 8-(1,3-butanedialkoxyethoxysilyl)-1-octyl acrylate; 10-(1,3-butanedialkoxyethoxysilyl)-1-decyl methacrylate; and bis-(3-(2-methyl-2,4-pentanedialkoxyethoxysilyl)-1-propyl)thioether.

In another embodiment, the cyclic dialkoxy organofunctional silanes are cyclic and bridging dialkoxy analogs to the 3-chloro-1-propyltriethoxysilane (3-triethoxysilyl-1-propyl chloride), used as a starting point for the manufacture of silane coupling agents as, for example, polysulfide silanes, such as triethoxysilylpropyl tetrasulfide referred to herein as TESPT, triethoxysilylpropyl disulfide referred to herein as TESPD. The cyclic and bridging dialkoxy haloalkyl silanes are novel and excellent alternatives to 3-triethoxysilyl-1-propyl chloride for use where reduced VOC emissions are desired.

The cyclic and bridging dialkoxy organofunctional silane compositions included herein may comprise single components or various mixtures of individual cyclic and bridging dialkoxy organofunctional silane components, organofunctional silane components, which contain only monofunctional alkoxy groups, and optionally including other species as well. Synthetic methods result in a distribution of various silanes, wherein mixtures of the starting components are employed for the purpose of generating mixtures of cyclic and bridging dialkoxy organofunctional silane products. Moreover, it is understood that the partial hydrolyzates and/or condensates of these cyclic and bridging dialkoxy organofunctional silanes, also referred to as cyclic and bridging dialkoxy organofunctional siloxanes and/or silanols, may be encompassed by the silanes herein as a side product of most methods of manufacture of the cyclic and bridging dialkoxy organofunctional silanes. Also, the partial hydrolyzates and/or condensates can occur upon storage of the cyclic and bridging dialkoxy organofunctional silanes, especially in humid conditions, or under conditions in which residual water remaining from their preparation is not completely removed subsequent to their preparation. Furthermore, partial to substantial hydrolysis of the cyclic and bridging dialkoxy organofunctional silanes may be deliberately prepared by incorporating the appropriate stoichiometry or excess of water into the methods of preparation described herein for the silanes. Also, the siloxane content of the cyclic and bridging dialkoxy organofunctional silanes may be deliberately prepared by incorporating the appropriate stoichiometry or excess of water into the methods of preparation for the silanes described herein. Silane structures herein encompassing hydrolyzates and siloxanes are described in the structures given in Formula 1 wherein the subscripts, v, of $Z^b$=(—O—)$_{0.5}$ and/or u, of X=OH can be substantive, meaning substantially larger than zero.

The silane compounds with heterocyclic silicon groups included herein may be prepared by transesterification of organofunctional alkoxy-substituted silanes and diols with or without a catalyst, by the esterification of organofunctional silyl halides with diols, or by the hydrosilylation of substituted alkenes with a hydrosilane containing a heterocyclic silicon group to generate cyclic and bridging silane compositions.

The transesterification of organofunctional alkoxy-substituted silanes and diols may be conducted with or without a catalyst. The catalyst may be an acid, a base or a transition metal catalyst. Suitable acid catalysts are hydrochloric acid, p-toluenesulfonic acid and the like. Typical base catalysts are sodium methoxide, sodium ethoxide. Suitable transition metal catalysts are tetraisopropyl titanate, dibutyltin dilaurate.

During esterification of organofunctional silyl halides with diols, diols are added to the silyl halide with removal of the hydrogen halide formed. The hydrogen halide may be removed by sparging with nitrogen or by using reduced pressure. Any remaining halo groups can be removed by the addition of an alcohol such as methanol, ethanol, isopropanol, and the like.

In another embodiment, the diol-derived organofunctional silane can be prepared by reacting a catalyzed mixture of organofunctional silane reactant and diol with simultaneous distillation. The reaction leads to the alcohol exchange of one or more of the alkoxy groups selectively at the silicon atom of the organofunctional silane reactant with the diol. The reaction is driven by the removal of the more volatile by-product alcohol by distillation. Suitable catalysts include acids such as p-toluenesulfonic acid, sulfuric acid, hydrochloric acid, chlorosilanes, chloroacetic acids, phosphoric acid, their mixtures, and so forth; bases such as sodium ethoxide; and, transition metal-containing catalysts such as titanium alkoxides, titanium-containing chelates, zirconium alkoxides, zirconium-containing chelates and mixtures thereof.

In yet another embodiment, the diol-derived organofunctional silane can be prepared by catalyzing a mixture of organofunctional silane and diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10° C. to about 150° C. and in another embodiment from about 30° C. to 90° C. while maintaining a pressure in the range of from about 0.1 to about 2000 mm Hg absolute, and in another embodiment, from about 1 to about 80 mm Hg absolute. Excess diol can be utilized to increase reaction rate.

In another embodiment the diol-derived organofunctional silane can be prepared by slowly adding diol to organofunctional silane in the presence of catalyst at the desired reaction temperature and under vacuum. If desired, a neutralization step may be utilized to neutralize any acid or base catalyst that may have been utilized thereby improving product storage.

Optionally, an inert solvent may be used in the process. The solvent may serve as a diluent, carrier, stabilizer, refluxing aid or heating agent. Generally, any inert solvent, i.e., one which does not enter into the reaction or adversely affect the reaction, may be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride, and so forth.

In another embodiment, the diol-derived organofunctional silane can be prepared by continuously premixing the flowstreams of organofunctional silane reactant, diol, and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising organofunctional silane, e.g., a thiocarboxylate silane, diol and catalyst to provide diol-derived organofunctional silane and by-product alcohol;

b) vaporizing the by-product alcohol from the thin film to drive the reaction;

c) recovering the diol-derived organofunctional silane reaction product;

d) optionally, recovering the by-product alcohol by condensation; and, e) optionally, neutralizing the diol-derived organofunctional silane product to improve its storage stability.

The molar ratio of diol to organofunctional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to organofunctional silane can be varied within a range of from about 95 to about 125 percent of stoichiometric equivalence for each alkoxy-silyl group to be transesterified. In a particular embodiment, the molar ratio of diol to organofunctional silane can be within the range of from about 100 to about 110 percent of stoichiometric equivalence. In another embodiment, the molar ratio can be within a range of from about 100 to about 105 percent of stoichiometric equivalence for the molar ratio of diol to organofunctional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the diol-derived organofunctional silane of this invention. Optimal temperatures and pressures (vacuum) for running the thin film process will depend upon the specific starting organofunctional silane's alkoxy groups and diol used in the process. Additionally, if an optional inert solvent is used in the process, that choice will affect the optimal temperatures and pressures (vacuum) utilized.

Typical silane functionalities that are useful in the present invention include, but are not limited to, amino, epoxy, ureido, isocyanato, vinyl, sulfur, mercapto, carbamate, styrylamino, methacryloxy, alkyl, and polyether.

The silanes may be applied to the filler using several techniques known to those skilled in the art. Common methods include the application of either a neat silane, pre-hydrolyzed silane, or a silane diluted with a suitable organic solvent, to the filler in a mixer. The mixer may be of various designs, including twin-shell mixers, Henschel-style mixers, Littleford-style mixers, or ribbon blenders. The treatment may also include a drying step in an oven. Alternatively, the silane may be applied to the filler during the normal compounding procedure used to produce a filled compound. For example, the silane treatment of the filler may be done in-situ during processing in a Banbury mixer, an extruder, a co-kneader or a two-roll mill. Another possibility is the addition of silane in the form of a silane masterbatch, where the silane is the form of a dry solid that can be easily fed into mixing equipment using standard solid feeding equipment. Examples of dry silane masterbatches include blends of silanes and waxes, such as vegetable waxes (e.g., carnauba, Japan, bayberry, candelilla, and the like), animal waxes (e.g., beeswax, Chinese wax, hydrogenated sperm oil wax, and the like), mineral waxes (e.g., ozocerite, montan, ceresin and the like), synthetic waxes (e.g., polyethylenes, polyethylene glycols, polyethylene esters, chloronaphthalenes, sorbitals, polychorotrifluoroethylenes, and the like), and petroleum waxes (e.g., paraffin, microcrystalline wax, and the like). Silanes can be supported on porous carriers such as those described in U.S. Pat. No. 5,112,919, including, but not limited to, high density polyethylene, low and linear low density polyethylene, polypropylene, ethylene vinyl acetate, polycarbonate, polyethylene terephthalate (PET), polybutylene terephthalate (PBT), polyamide, or any other commonly produced porous polymer carrier, or can be adsorbed on non-reactive solid carriers. In any of these processes, the silanes may be added in portions to the filler, or all at once.

The treated filler can then be incorporated into a matrix to provide a composite body with the desired qualities. The matrix is typically a polymeric material such as a thermoplastic or thermoset polymer. Non-limiting examples of such polymers (including homopolymers, copolymers, and blends thereof) include olefinic polymers such as, for example, polyethylene, polypropylene, polybutylene, ethylene vinyl acetate, etc., polyvinylchloride (PVC), polyesters, polystyrene, acrylics, phenolics, epoxies, polyamides, acetals, polyphenyleneoxide (PPO), polycarbonates, silicones, and natural and synthetic rubbers and elastomers. Methods of incorporating filler into a matrix are known in the art, as well as fabricating the resulting composite body into a desired shape or form.

The following nonrestrictive examples illustrate the invention. The comparative examples are presented for comparison purposes only and do not illustrate the invention. All composition percentages and parts are by weight unless otherwise indicated.

The following procedures were used for formulating and processing the materials to be tested.

The formulations shown in Table 2 were mixed at 2000 rpm for a short duration in an Henschel high intensity mixer. Aluminum trihydroxide and 1% of the various coupling agent formulations in Table 1 were distributed on four levels of the ATH in the Henschel and were mixed for ninety seconds. The identified polymers were added to the mix and mixed for another thirty seconds.

Preblended materials were extruded on a Werner & Pfleiderer ZSK 30 mm intermeshing, co rotating twin screw extruder, run in a starve fed manner. The feed stream to the extruder was controlled using a metering KTron feeder. The extruder was fitted with a screw designed so as to give distributive and dispersive mixing and not cause high peak temperatures, which could cause the degradation of the polymers and ATH. The extruder was vented to atmosphere, to prevent the build up of volatiles in the extruder, which in turn could cause porosity in the extrudates and restricted the feed flow in the extruder. Extrudates from a four-hole die was water quenched and air-dried and pellitized on a Cumberland pellitizer. Pelleted material was dried in an oven at 65° C. The pelleted and dried batches were injection molded into specimens (dog bones) on a twenty-eight ton Arburg 1.2 oz injection molder. Extrusion and Injection molding conditions are summarized in Table 3, below. with temperature profiles. The extruder was a pump and also a reactor. Both the mechanical and chemical variables had to be controlled so as to give an excellent product.

The processing temperatures were set so as to match the screw design to get a melt temperature not greater than 200° C., which is essential for a stable operation, because the screw has no cooling capabilities. The screw RPM was also set at 150 to limit the residence time.

Molded dog bone specimens were allowed to reach thermal equilibrium at 22° C. for forty-eight hours. Tensile strength, elongation and modulus at break were determined according to ASTM 638, using a crosshead speed of 20 in/min for all samples. The data are shown in Table 4.

Comparative Example 1

A control sample was prepared from a polymer blend containing 9 parts of a linear low density polyethylene having a melt index of 2.0 g/10 min (available under the designation Escorene 1002 from Exxon Mobil) and 25.8 parts of Ultra Ethylene Vinyl Acetate LD 768 containing 27.5% vinyl acetate and also available from Exxon Mobil, as the polymer matrix, The control sample further included 65 parts of aluminum trihydroxide as the filler, and 0.2 parts of Irganox 1010 (available from. Ciba-Geigy) as an antioxidant. The components were processed in an extruder in accordance with the conditions and settings described above and set forth in Table 3 to provide a control sample containing no coupling agent for filler treatment. The extruded sample was then tested for mechanical properties in accordance with standard measurement techniques. The values for stress at breakage (psi), elongation at breakage (%), and modulus at breakage (psi) are set forth in Table 4.

Comparative Example 2

This comparative example illustrates the preparation and testing of a sample containing a coupling agent containing a high VOC silane and does not illustrate the invention. The coupling agent comprised a mixture of 160 parts vinyltriethoxy silane, 10 parts 2.4-dimethyl-6-(1-methylpentadecyl)phenol, 20 parts of vinyl modified polydimethylsiloxane and 10 parts of 1,1-di-(tert-butylperoxy)-3,3,5-trimethylcyclohexane. 8.7 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 1.0 part of the coupling agent of this comparative example, and processed through an extruder in accordance with the conditions and settings described above and set forth in Table 3 to provide an extruded sample containing a coupling agent not in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

Example 3

This example illustrates the preparation of a low VOC vinyl silane for use as a coupling agent in the invention.

Low VOC vinyl silane designated herein as Vinyl Silane A was prepared by the following method: 1173.4 Grams (6.16 moles) of vinyltriethoxy silane (Silquest® A-151, available from GE Silicones) and 9.5 grams of a sulfonated ion exchange resin (Purolite CT-275 catalyst, available from Purolite Co., Inc.) were added to a 3 L round bottom flask equipped with an Oldershaw five plate distillation column, short path distillation head, and addition funnel. 728.3 Grams (6.16 moles) of hexylene glycol (available from Sigma-Aldrich Chemical Co.) were charged to the addition funnel. The contents of the flask were heated to about 50° C. under vacuum at about 90 mm Hg. The hexylene glycol was charged over a period of about 3 hours to the flask. After addition was completed, the vacuum was slowly increased to maintain a steady distillation of ethanol. Distillation was continued until full vacuum and a pot temperature of about 56° C. was obtained. The material was then allowed to cool for 12 hours and was filtered to remove the Purolite catalyst. Next, the material was placed in a 2 L round bottom flask equipped with an Oldershaw five plate distillation column, and the remaining ethanol was removed at ambient pressure and a pot temperature of about 80° C. to yield approximately 1097 grams of Vinyl Silane A.

Example 4

This example illustrates the preparation and testing of a sample containing the coupling agent containing the low VOC Vinyl Silane A of Example 3 in accordance with the invention. The coupling agent comprised a mixture of 181.6 parts Vinyl Silane A, 10 parts 2.4-dimethyl-6-(1-methylpentadecyl)phenol, 20 parts of vinyl modified polydimethylsiloxane and 10 parts of 1,1-di-(tert-butylperoxy)-3,3,5-trimethylcyclohexane. 8.7 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 1.0 part of the coupling agent of this example, and processed through an extruder in accordance with the conditions and settings described above and set forth in Table 3 to provide an extruded sample containing a coupling agent in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

Comparative Example 5

This comparative example illustrates the preparation and testing of a sample containing a coupling agent containing a mixture of methacryloxypropyltriethoxy silane with high VOC silane, and does not illustrate the invention. The coupling agent comprised a mixture of 60 parts vinyltriethoxy silane, 90 parts methacryloxypropyltriethoxy silane, 10 parts 2.4-dimethyl-6-(1-methylpentadecyl)phenol, 30 parts of vinyl modified polydimethylsiloxane and 10 parts of 1,1-di-(tert-butylperoxy)-3,3,5-trimethylcyclohexane. 8.7 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 1.0 part of the coupling agent of this example, and processed through an extruder in accordance with the conditions and settings described above and set forth in Table 3 to provide an extruded sample containing a coupling agent not in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

Example 6

This example illustrates the preparation and testing of a sample containing a coupling agent containing a mixture of methacryloxypropyltriethoxy silane with the low VOC Vinyl Silane A of Example 3. The coupling agent comprised a mixture of 68.19 parts low VOC Vinyl Silane A, 90 parts methacryloxypropyltriethoxy silane, 10 parts 2.4-dimethyl-6-(1-methylpentadecyl)phenol, 30 parts of vinyl modified polydimethylsiloxane and 10 parts of 1,1-di-(tert-butylperoxy)-3,3,5-trimethylcyclohexane. 8.7 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 1.0 part of the coupling agent of this example, and processed through an extruder in accordance with the conditions and settings described above and set forth in Table 3 to provide an extruded sample containing a coupling agent not in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

Comparative Example 7

This comparative example illustrates the preparation and testing of a sample containing a coupling agent containing a high VOC silane and does not illustrate the invention. The coupling agent comprised 200 parts of high VOC gamma-aminopropyltriethoxy silane. 8.7 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 1.0 part of the coupling agent of this example, and processed through an extruder in accordance with the conditions and settings described above and set forth in Table 3 to provide an extruded sample containing a coupling agent not in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

Example 8

This example illustrates the preparation and testing of a sample containing a coupling agent containing a low VOC silane. The coupling agent comprised 200 parts of gamma-aminopropyl silane modified with 2-methyl-1,3-propanediol. 8.71 Parts of linear low density polyethylene (Escorene 1002) and 25.1 parts of Ultra Ethylene Vinyl Acetate LD 768 as the polymer matrix, 65 parts of aluminum trihydroxide filler and 0.2 parts Irganox 1010 antioxidant were combined with 0.99 parts of the coupling agent of this example, and processed through an extruder in accordance with the conditions and settings described above and set forth in Table 3 to provide an extruded sample containing a coupling agent not in accordance with the invention. The sample was then tested for mechanical properties in accordance with the standard measuring techniques employed in Comparative Example 1. The values for stress, at break (psi), elongation at breakage (%), and modulus at breakage (psi) are set forth in Table 4.

TABLE 1

Formulations of Coupling Agents

| Ingredients (Parts by weight) | Comp. Ex 2 | Ex 4 | Comp. Ex 5 | Ex 6 | Comp. Ex 7 | Ex. 8 |
|---|---|---|---|---|---|---|
| Vinyltriethoxysilane (A-151) High VOC | 160 | | 60 | | | |
| Vinyl Silane A (Made with Hexylene Glycol Low VOC | | 181.86 | | 68.19 | | |
| Methacryloxypropyltriethoxysilane | | | 90 | 90 | | |
| gamma Aminopropyltriethoxysilane (A-1100) High VOC | | | | | 200 | |
| gamma Aminopropyl silane made with: 2 Methyl 1,3-Propandiol (Low VOC) | | | | | | 200 |
| 2,4-Dimethyl-6-(1methylpentadecyl) Phenol [Irganox 1141] | 10 | 10 | 10 | 10 | | |
| Vinyl Modified Polydimethylsiloxane | 20 | 20 | 30 | 30 | | |
| 1,1-di-(tert-butylperoxy)-3,3,5-trimethylcyclohexane | 10 | 10 | 10 | 10 | | |

TABLE 2

Halogen Free Flame Retardant Formulations

| Ingredients | Comp Ex 1 | Comp Ex 2 | Ex 4 | Comp Ex 5 | Ex 6 | Comp Ex 7 | Ex 8 |
|---|---|---|---|---|---|---|---|
| Linear Low Density Polyethylene Escorene 1002 (MFI: 2) | 9 | 8.7 | 8.7 | 8.7 | 8.7 | 8.7 | 8.71 |
| Ultra Ethylene Vinyl Acetate LD 768.MJ | 25.8 | 25.1 | 25.1 | 25.1 | 25.1 | 25.1 | 25.1 |
| Aluminum trihydroxide Hydral 710 | 65.0 | 65.0 | 65.0 | 65.0 | 65.0 | 65.0 | 65.0 |
| High VOC silane of Comp. Ex 2 | | 1.0 | | | | | |
| Low VOC silane of Ex 3 | | | 1.0 | | | | |
| High VOC silane of Comp Ex 5 | | | | 1.0 | | | |
| Low VOC silane of Ex 6 | | | | | 1.0 | | |
| High VOC silane of Comp Ex 7 | | | | | | 1.0 | |
| Low VOC silane of Ex 8 | | | | | | | 0.99 |
| Irganox 1010 | 0.2 | 0.2 | 0.2 | 0.2 | 0.2 | 0.2 | 0.2 |

TABLE 3

Extruder Temperature Profile

| Extruder W&P Zsk 30 mm Characteristics | Set Temp. °C | Comp Ex 1 | Comp Ex 2 | Ex 4 | Comp Ex 5 | Ex 6 | Comp Ex 7 | Ex 8 |
|---|---|---|---|---|---|---|---|---|
| Zone 1 | 140 | 138 | 137 | 140 | 140 | 139 | 140 | 138 |
| Zone 2 | 145 | 143 | 145 | 142 | 145 | 144 | 147 | 149 |
| Zone 3 | 150 | 155 | 155 | 157 | 156 | 157 | 154 | 158 |
| Zone 4 | 160 | 165 | 163 | 160 | 159 | 165 | 165 | 159 |
| Zone 5 | 165 | 167 | 166 | 165 | 162 | 165 | 165 | 165 |
| Zone 6 | 180 | 182 | 181 | 182 | 180 | 180 | 181 | 181 |
| Stock Temperatures | | | | | | | | |
| 7 | | 165 | 180 | 170 | 165 | 159 | 162 | 163 |
| 8 | | 170 | 175 | 175 | 175 | 175 | 175 | 175 |
| 9 | | 195 | 195 | 195 | 185 | 180 | 181 | 190 |
| RPM | | 150 | 150 | 150 | 150 | 150 | 150 | 150 |
| Die [Type] | 4-Hole | 4-Hole | 4-Hole | 4-Hole | 4-Hole | 4-Hole | 4-Hole | 4-Hole |
| Screw Design | ATH | ATH | ATH | ATH | ATH | ATH | ATH | ATH |
| Torque [%] | | 100 | 110 | 95 | 110 | 110 | 110 | 100 |
| Pressure [psi] | | 600 | 650 | 600 | 500 | 500 | 500 | 500 |
| Gassing: Vent | ATM | ATM | ATM | ATM | ATM | ATM | ATM | ATM |
| Auger size [open curl] | Small | Small | Small | Small | Small | Small | Small | Small |
| Feeder [%] | | 52 | 38 | 48 | 54 | 56 | 44 | 40 |
| Pelletizer setting | | 1.0 | 1.0 | 1.0 | 1.0 | 1.0 | 1.0 | 1.0 |
| Output [lbs/hr] | | 17.7 | 20.2 | 17.8 | 18.2 | 17.8 | 16.0 | 16.6 |
| Color Comments | | White | White | White | White | White | White | White |

TABLE 4

Physical Properties Of Extruded Samples

| Physical Properties | Comp Ex 1 | Comp Ex 2 | Ex 4 | Comp Ex 5 | Ex 6 | Comp Ex 7 | Ex 8 |
|---|---|---|---|---|---|---|---|
| Stress @ Auto Break (psi) | 1378 | 2763 | 2965 | 2784 | 2813 | 2669 | 2615 |
| Elongation @ Auto Break (%) | 120 | 84 | 144 | 222 | 187 | 128 | 151 |

TABLE 4-continued

Physical Properties Of Extruded Samples

| Physical Properties | Extruded HFFR Compounds | | | | | | |
|---|---|---|---|---|---|---|---|
| | Comp Ex 1 | Comp Ex 2 | Ex 4 | Comp Ex 5 | Ex 6 | Comp Ex 7 | Ex 8 |
| Modulus @ Auto Break (psi) | 1148 | 3289 | 2059 | 1254 | 1504 | 2085 | 1732 |

The above results as set forth in Table 4 show that the coupling agent of the invention (Examples 4, 6 and 8) provide superior mechanical properties to the product samples as compared with the sample of Comparative Example 1. Example 4 displayed higher stress at break and elongation than Comparative Example 2. Example 6 exhibited higher stress at break and modulus than Comparative Example 5. Example 8 exhibited higher elongation than Comparative Example 7.

While the above description contains many specifics, these specifics should not be construed as limitations of the invention, but merely as preferred embodiments thereof. Those skilled in the art will envision many other embodiments within the scope and spirit of the invention.

What is claimed is:

1. A method for treating filler material comprising:
   (i) placing a filler into a mixer;
   (ii) contacting the filler material with at least one silane of the general formula:

$$[Y[-G(-SiX_u Z^b_v Z^c_w)_s]_r]_n \quad \text{(Formula 1)}$$

wherein
   each occurrence of G is independently $-(CH_2)_m-$, where m is 1 to 12, $-CH_2(CH_2)_q CH(CH_3)-$, where q is 0 to 17, or G can be a chemical bond;
   each occurrence of X is independently $R^1O-$ or $-O(R^{10}CR^{11})_f OH$, wherein each occurrence of $R^1$ is independently hydrogen, methyl, ethyl, propyl, isopropyl or butyl;
   each $-R^{10}$ and $R^{11}$ is independently hydrogen, methyl or ethyl;
   each occurrence of $Z^b$ is independently $(-O-)_{0.5}$ and $[-O(R^{10}CR^{11})_f O-]_{0.5}$, wherein each occurrence of $R^{10}$ and $R^{11}$ is independently hydrogen, methyl or ethyl;
   each occurrence of $Z^c$ is independently given by $-O(R^{10}CR^{11})_f O-$ wherein each occurrence of $R^{10}$ and $R^{11}$ is independently hydrogen, methyl or ethyl;
   each occurrence of the subscript f is independently an integer from 1 to 15;
   each occurrence of the subscript n is an integer from 1 to 100, with the proviso that when n is greater than 1, v is an integer greater than 0 and all the valences for $Z^b$ have a silicon atom bonded to them;
   each occurrence of the subscript u is independently an integer from 0 to 3;
   each occurrence of the subscript v is independently an integer from 0 to 3;
   each occurrence of the subscript w, is independently an integer from 0 to 1, with the proviso that u+v+22w=3;
   each occurrence of the subscript s is an integer 1;
   each occurrence of the subscript r is an integer 1; and
   each occurrence of Y is independently an organofunctional group of valence, r, selected from the group consisting of $CH_2=CH-$, $CHR=CH-$, and $CR_2=CH-$, wherein each occurrence of R is independently hydrogen, methyl, ethyl, propyl, isopropyl, butyl, octenyl, cyclohexyl, phenyl, benzyl, tolyl or tolyl and $R^4$ is independently one of the structures given for R;
   with the provisos that said silane contains at least one occurrence of $Z^c$ group and, which upon hydrolysis provides by-product diol, which is not a volatile organic compound possessing a boiling point up to 185° C. at atmospheric pressure;
   (iii) mixing the silane composition in contact with the filler of step (ii); and optionally
   (iv) drying the mixture of step (iii).

2. The method of claim 1 wherein Y is $CH_2=CH-$.

3. The method of claim 2 wherein G is a chemical bond.

4. The method of claim 3 wherein each occurrence of $Z^b$ and $Z^c$ is a dialkoxy group derived from ethylene glycol, propylene glycol, neopentyl glycol, 1,3-propanediol, 3-methyl-1,3-propanediol, 1,3-butanediol, 2-methyl-2,4-pentanediol, 1,4-butanediol, and pinacol.

5. The method of claim 1 wherein G is
   $-(CH_2)_m-$ wherein m is 1 to 12 or
   $-CH_2(CH_2)_q CH(CH_3)-$ wherein q is zero to 17.

6. The method of claim 1 wherein $R^1$ is independently methyl, ethyl, propyl, isopropyl, or butyl.

7. The method of claim 1 wherein $R^{10}$ and $R^{11}$ is each independently selected from a group consisting of hydrogen and methyl.

8. The method of claim 3 wherein $R^1$ is independently selected from the group consisting of hydrogen, methyl, ethyl and propyl.

9. The method of claim 3 wherein X is independently methoxy, ethoxy, butoxy, propoxy, isopropoxy, or monovalent alkoxy groups having the structure $-O(R^{10}CR^{11})_f OH$, where each occurrence of $R^{10}$ and $R^{11}$ is independently hydrogen or methyl and f is 1 to 15.

10. The method of claim 9 wherein $Z^b$ and $Z^c$ are divalent alkoxy groups derived from the diols consisting of ethylene glycol, propylene glycol, neopentyl glycol, 1,3-propanediol, 2-methyl-1,3-propanediol, 1,3-butanediol, and 2-methyl-2,4-pentanediol.

11. The method of claim 1 wherein
    X is methoxy, ethoxy, propoxy, isopropoxy, butoxy or monovalent alkoxy group derived from 1,3-propanediol, 2-methyl-1,3-propanediol, 1,3-butanediol, or 2-methyl-2,4-pentanediol,
    $Z^b$ and $Z^c$ are derived from 1,3-propanediol, 2-methyl-1,3-propanediol, 1,3-butanediol, or 2-methyl-2,4-pentanediol,
    $R^1$ is independently selected from the group consisting of hydrogen, methyl, ethyl and propyl, and
    G is a chemical bond.

12. The method of claim 1 wherein X is ethoxy or one or more of the divalent alkoxy groups derived from the diols selected from the group consisting of 1,3-propanediol, 2-methyl-1,3-propanediol, 1,3-butanediol, and 2-methyl-2,4-pentanediol, and
    G is a $C_2$-$C_{12}$ straight-chain alkyl derivative.

13. The method of claim 1 wherein the filler material includes one or more material selected from the group consisting of silicas, tales, clays, and aluminas, wollastonite, alumina tri-hydrate (ATH), magnesium hydroxide, kaolin, bentonite, precipitated or fumed silica, titanium dioxide, glass beads, basalt, calcium sulfate, calcium carbonate, barium sulfate, graphite, carbon black, hemp, flax and kenaf.

14. The method of claim 1 wherein the filler material comprises particles or fibers.

15. The method of claim 1 wherein the silane is blended with a wax.

16. The method of claim 1 further comprising incorporating the treated filler into a polymeric matrix to provide a composite body.

17. A composite body produced by the method of claim 16.

18. A method for treating filler material with a composition containing the silane of claim 1 wherein the mixer is a twin-shell mixer, Henschel-style mixer, Littleford-style mixer, or a ribbon blender.

19. A method for treating filler material with a composition containing the silane of claim 1 wherein the treated filler contains the by-product diol, which is not a volatile organic compound possessing a boiling point up to 185° C. at atmospheric pressure.

20. A filler treated with a silane in accordance with the method of claim 1.

* * * * *